Feb. 7, 1939.　　　　O. OLSON　　　　2,146,438
TRIMMING ASSEMBLY FOR AUTOMOTIVE VEHICLE BODIES
Original Filed March 1, 1935　　2 Sheets-Sheet 1
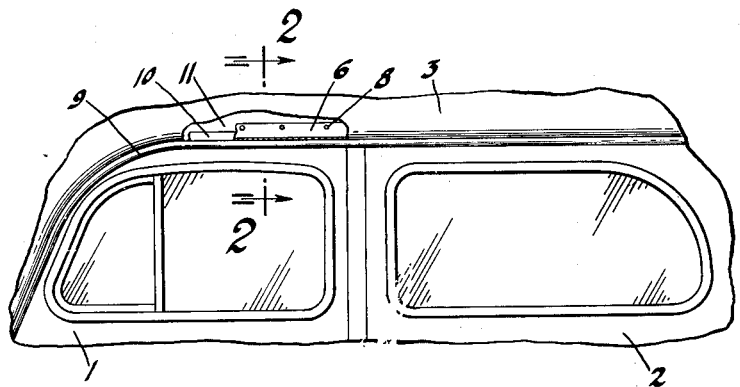
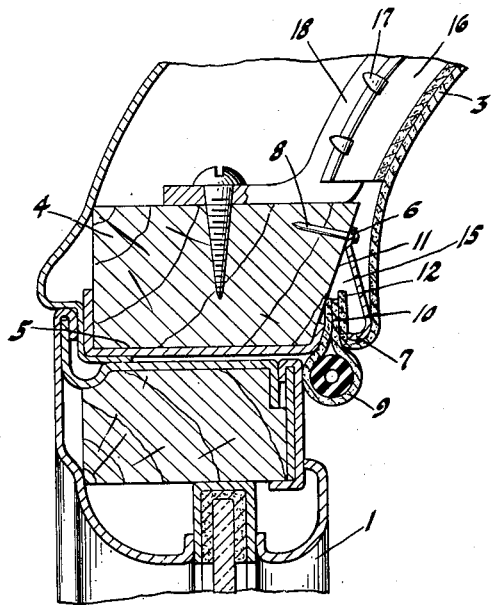
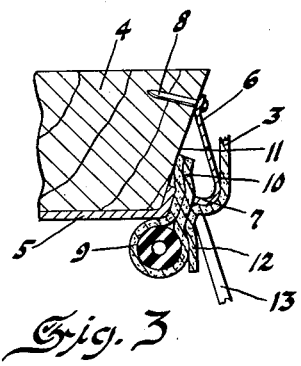
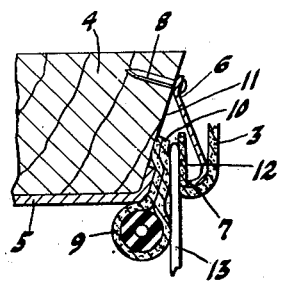
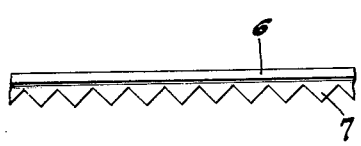
INVENTOR.
Oscar Olson
BY
Barnes, Kisselle, Laughlin & Raisch
ATTORNEYS.

Feb. 7, 1939. O. OLSON 2,146,438
TRIMMING ASSEMBLY FOR AUTOMOTIVE VEHICLE BODIES
Original Filed March 1, 1935  2 Sheets—Sheet 2

INVENTOR.
Oscar Olson
BY
Barnes, Kisselle, Laughlin & Raisch
ATTORNEYS

Patented Feb. 7, 1939

2,146,438

UNITED STATES PATENT OFFICE 2,146,438

TRIMMING ASSEMBLY FOR AUTOMOTIVE VEHICLE BODIES

Oscar Olson, Dearborn, Mich., assignor to General Motors Corporation, Detroit, Mich., a corporation of Delaware Continuation of application Serial No. 8,818, March 1, 1935. This application July 25, 1936, Serial No. 92,622

4 Claims. (Cl. 296—135)

This invention relates to a trimming assembly for an automotive vehicle body. It is more particularly concerned with the fastening of the edge portions of the trimming to the body. This application is a continuation of application Serial No. 8,818, filed March 1, 1935.

It is an object of this invention to produce a trimming assembly which is very neat in appearance and which permits the trimming material to be easily assembled to the body. More particularly the object of the invention resides in trimming the interior of the body so that the edges of the trimming are very neat and the securing means concealed. One of the difficulties encountered in the securing of a vehicle body head lining in place is that the head lining wrinkles due to the uneven tension applied to the lining and to the inability to readily control this tension. The applicant has provided a method for trimming a vehicle body which permits the tension of the trimming material to be controlled at all times and at all points thereby obviating any wrinkling of the trimming material and obtaining a smooth finished trimming with facility.

In the drawings:

Fig. 1 is a fragmentary view of the inside of a vehicle body with the head trimming partly broken away.

Fig. 2 is a section along the line 2—2 of Fig. 1.

Figs. 3 and 4 show the steps in the assembly of the edges of the trimming to the body.

Fig. 5 is a detail of the retainer strip for the trimming.

Figure 6:
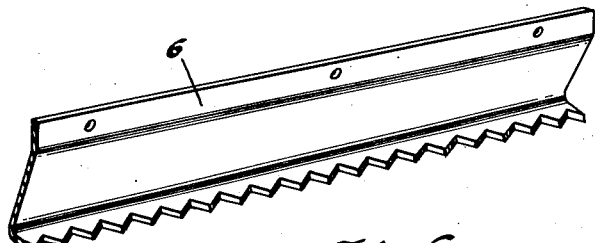
Fig. 6 is a detail perspective view of the retainer strip for the trimming.
Figure 7:
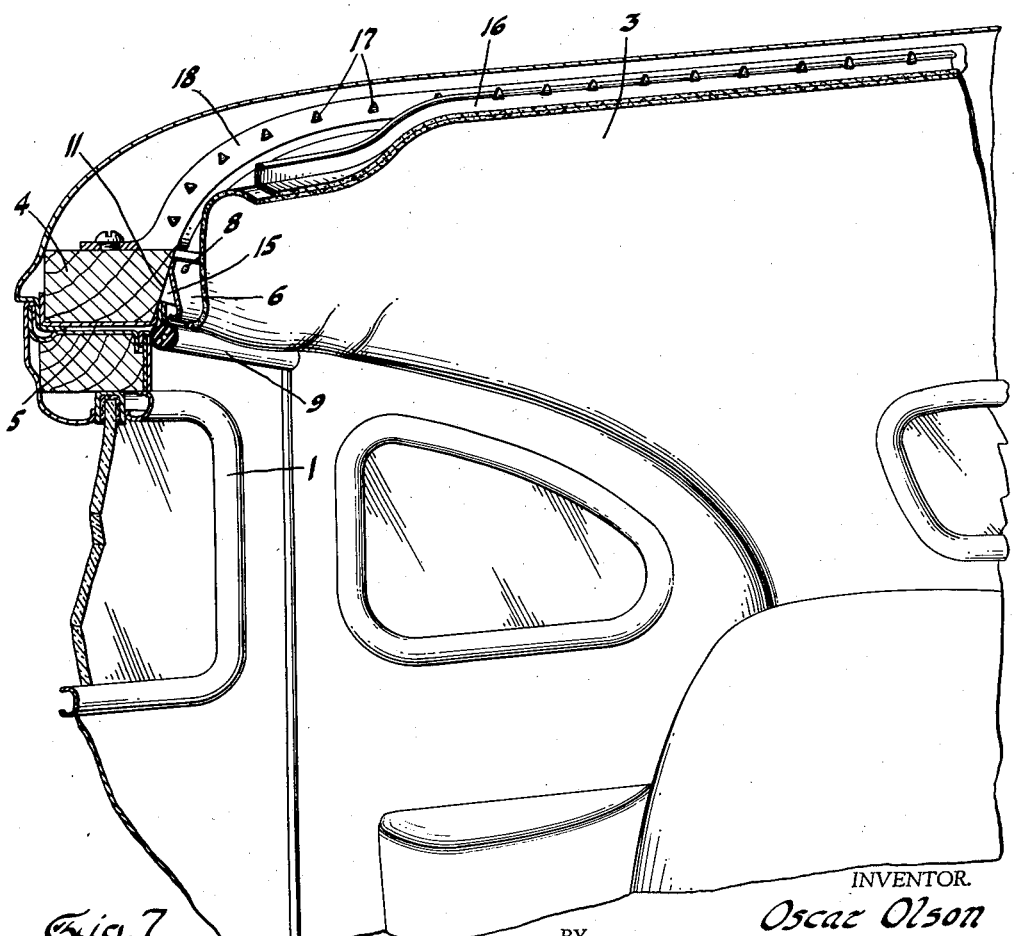
Fig. 7 is a fragmentary perspective of a vehicle body showing the roof trimming material in the process of being secured in place.

Referring more particularly to the drawings, there is shown a vehicle body having a front door 1, a rear door 2 and head lining 3. To secure the head lining intermediate its edges to the roof of the vehicle body, the lining 3 is provided with the usual plurality of listing strips 16 which extend transversely thereof and are impaled upon spurs 17 struck out of the metal roof bows 18. For descriptive purposes the invention will be shown as applied in the securing of the head lining trimming to the roof rail 4 along the door opening 5. However, it is understood that this method of assembling to the body and the means comprising this assembly may be used for securing other portions of the trimming material to the body.

As herein shown the inner face of the roof rail 4 is provided with a metal strip 6 having an inwardly turned serrated edge 7. The strip 6 conveniently may be fastened to the roof rail 4 by nails 8 if it is made of wood, or may be secured to the rail by screws, welding, or otherwise if it is metal. The nails 8 are preferably spaced a sufficient distance from the serrated edge 7 to be sprung away from the rail 4. Preferably the nails are inserted along the upper edge of the strip 6. The edge of the door opening 5 is provided with the usual windhose 9 for sealing the joint between the edge of the door and the door opening frame. The windhose 9 preferably is nailed or otherwise secured to the roof rail 4 with the listing 10 of the windhose concealed beneath the serrated strip 6. If desired, the inner face 11 of the roof rail 4 may be inclined upwardly and inwardly of the body. This facilitates the yielding or spring action of the serrated metal strip 6 because the strip 6 tends to fulcrum or spring about the nails 8 as the trimming is secured in place.

To secure the edge of the trimming 3 in place a thin instrument such as a putty knife or spatula may be used. As shown in Figures 3 and 4, the instrument may be placed against the trimming 3 somewhat inwardly of its free edge 12. By pressing the instrument 13 upwardly between the teeth of the strip 6 and the windhose and the inner face of the roof rail 4, the serrated metal strip 6 yields or is sprung outwardly (Fig. 4) and the trimming material tucked in between the strip and the roof rail. The serrations or teeth 7 are turned outwardly toward the face 11 of the rail and then slightly upwardly, that is, inwardly of pocket 15, thus permitting the blunt edge instrument 13 and the trimming to be easily tucked in position. The teeth bite into the trimming 3 to securely hold it in position upon withdrawal of the instrument 13. This inclination of the teeth 7 permits the trimming to be readily passed by and tucked into position between the strip and the rail 4, but the teeth 7 dig into the trimming and effectively prevent its removal by any pull exerted on the trimming.

After the trimming is assembled it may be removed by inserting an instrument between the serrated edge 7 of the strip 6 and the rail 4, using this instrument as a lever to spring the edge 7 of the strip 6 outwardly which releases the pressure of the teeth against the trimming 3 and permit its withdrawal.

It will be noted that the securing strip is entirely concealed by the trimming 3 and that this method of securing the edge of the trimming in position gives the edge a clean cut and very neat appearance.

Since the serrated continuous strip 6 is secured along its upper edge to the inner face 11 of the roof rail 4 and extends downwardly at an angle to the face 11, the resilient strip 6 cooperates with the face 11 to form an intervening space or pocket 15 throughout the entire length of the strip into which the edge of the trimming material is tucked (Figs. 2 and 4).

After the head lining has been secured to the roof bows 18 by impaling the listing strips 16 on the spurs 17, it is then drawn taut over the outside of the serrated metal strip to conceal the same, and then the free edge 12 of the trimming is tucked into the pocket 15 and impaled upon the teeth 7 of the serrated strip as above described. The step of tucking the edge of the trim material in the pocket is used to finally tension the trim material and remove any wrinkles from the head lining. By this method of trimming the vehicle body the tension of the trimming material can be controlled at all times and at all points thereby preventing any wrinkling of the trimming material and obtaining a smooth finished trimming with facility. If, for example, in the securing of the trimming material in place, one portion is placed under greater tension than another thereby causing a wrinkle, the wrinkle can very readily and easily be removed by tucking the adjacent edge of the trim material further into the pocket 15 which equalizes the tension on the head lining and removes the wrinkle. The turning of the serrations or teeth 7 upwardly into the pocket 15 gives them a "fish-hook" effect, that is, the edge of the trimming is easily inserted in place but cannot be removed other than as above described, and therefore this tucking of the edge 12 of the trimming into the pocket 15 to control or equalize the tension on the head lining to remove wrinkles and obtain a smooth head lining can be very easily and quickly achieved.

It will be noted that the head lining 3 is finally tensioned and the wrinkles removed by tucking the edge of the trim material into the pocket 15. Attention is also called to the fact that the initial position of the trim retainer strip 6, upon being nailed to the roof rail 4, is the same as its final position after the trim material has been tucked into the pocket 15 and impaled upon the serrated edge of the strip 6. The point is that the position of the trim retainer strip 6 is the same initially before the edge of the trimming 3 is tucked into the pocket 15 and finally after the edge of the trimming is tucked into the pocket 15 and that it is the tucking of the trim into the pocket which tensions the trim and removes the wrinkles.

This is a very different and much more practical method than that shown in the Bossemeyer Patent 1,979,858 where in its initial position the toothed trim retaining strip is open and the trimming then impaled thereon. Bossemeyer then bends his trim retaining strip to closed or final position which tensions the trim. It is unlikely that in the bending down of Bossemeyer's toothed retainer strip that the trimming is equally tensioned. Obviously the removal of the attendant wrinkles can only be achieved, if at all, with such difficulty as to render Bossemeyer's method impractical and useless. The point is that in the instant method the retainer strip 6 occupies the same position initially before the trim is attached as it does after the trim is attached and no bending of the trim retainer strip 6 from one position to another is at all required to tension the trim and remove wrinkles.

I claim:

1. The method of trimming a vehicle body comprising the following steps: forming a pocket between a body wall and a continuous metal strip having a serrated edge by securing the strip initially to the wall with a portion of the strip throughout the entire length of the strip spaced from the wall and with the serrated edge of the strip turned inwardly into the pocket to permit the edge of the trim material to be readily tucked past the serrations and impaled thereon, drawing the trim material taut over the outside of the serrated metal strip to conceal the same, tucking the edge of the trim material into the pocket to finally tension the trim material and remove wrinkles, and impaling the edge of the trim material on the serration in the initial position of the strip and the serrated edge to complete the securement of the trim material to the wall.

2. The method of trimming a vehicle body comprising the following steps: forming a pocket between a body wall and a continuous metal strip having a serrated edge by securing initially the one edge of the strip to the wall with the portion of the strip between its secured and serrated edges and throughout the length of the strip spaced from the wall and with the serrations turned inwardly of the pocket to a position where the trimming material may be readily tucked into the pocket and impaled on the serrations, drawing the trim material over the metal strip to conceal the same, then tucking the edge of the trim material into the pocket past the serrations and thereby finally placing the trim material under tension to remove the wrinkles, and impaling the edge of the trim material on the serrated edge of the strip as initially secured in position on the body wall to complete the securement of the trim material to the wall, the cross sectional contour of the metal strip being substantially the same and occupying substantially the same position relative to the body wall both when the strip is initially secured to the body wall and when the trim material has been finally secured thereto.

3. The method of trimming a vehicle body comprising the following steps: forming a pocket between a body wall and a continuous resilient metal strip having a serrated edge by securing the strip initially to the wall with a portion of the strip throughout the entire length of the strip spaced from the wall and with the serrated edge of the strip turned inwardly into the pocket to permit the edge of the trim material to be readily tucked past the serrations and impaled thereon, drawing the trim material taut over the outside of the resilient serrated metal strip to conceal the same, simultaneously springing the serrated edge of the resilient metal strip away from the body wall and tucking the edge of the trim material past the serrated edge into the pocket to tension the trim material and remove wrinkles and thereby impaling the edge of the trim material on the serrations and then releasing the resilient metal strip to permit the same to spring back to its initial position and thereby complete the securement of the trim material to the wall.

4. The method of trimming a vehicle body comprising the following steps: forming a pocket between a body wall and a continuous resilient metal strip having a serrated edge by securing the strip initially to the wall along one edge with a portion of the strip throughout the entire length of the strip spaced from the wall and with the serrated edge of the strip turned inwardly into the pocket to form a mouth between the serrated edge of the strip and the wall through which the edge of the trim material may be readily tucked past the serrations and impaled thereon, drawing the trim material taut over the outside of the serrated metal strip to conceal the same, simultaneously springing the resilient metal strip away from the body wall and simultaneously crowding the edge of the trim material into the pocket past the serrations to tension the trim material and remove wrinkles, and impaling the edge of the trim material on the serrations and then releasing the resilient metal strip to permit the same to spring back to substantially its initial position, the cross sectional contour of the resilient metal strip being substantially the same and occupying substantially the same position relative to the body wall both when the strip is initially secured to the body wall and when the trim material has been finally secured thereto.

OSCAR OLSON.